US010501197B2

(12) United States Patent
Evulet

(10) Patent No.: US 10,501,197 B2
(45) Date of Patent: Dec. 10, 2019

(54) FLUIDIC PROPULSIVE SYSTEM

(71) Applicant: Jetoptera, Inc., Mason, OH (US)

(72) Inventor: Andrei Evulet, Mason, OH (US)

(73) Assignee: Jetoptera, Inc., Edmonds, WA (US)

( * ) Notice: Subject to any disclaimer, the term of this patent is extended or adjusted under 35 U.S.C. 154(b) by 547 days.

(21) Appl. No.: 15/221,389

(22) Filed: Jul. 27, 2016

(65) Prior Publication Data

US 2017/0057647 A1   Mar. 2, 2017

Related U.S. Application Data

(60) Provisional application No. 62/213,465, filed on Sep. 2, 2015.

(51) Int. Cl.

| | |
|---|---|
| *B64D 33/04* | (2006.01) |
| *B64C 15/14* | (2006.01) |
| *B64C 39/02* | (2006.01) |
| *B64D 27/18* | (2006.01) |
| *B64D 29/02* | (2006.01) |
| *B64D 33/02* | (2006.01) |
| *B64C 9/38* | (2006.01) |
| *B64C 15/00* | (2006.01) |
| *B64C 21/00* | (2006.01) |

(Continued)

(52) U.S. Cl.
CPC ............... *B64D 33/04* (2013.01); *B64C 9/38* (2013.01); *B64C 15/00* (2013.01); *B64C 15/14* (2013.01); *B64C 21/00* (2013.01); *B64C 21/04* (2013.01); *B64C 39/024* (2013.01); *B64D 27/10* (2013.01); *B64D 27/18* (2013.01); *B64D 29/02* (2013.01); *B64D 33/02* (2013.01); *F02C 3/04* (2013.01); *F02C 6/04* (2013.01); *F02K 1/002* (2013.01); *F02K 1/36* (2013.01); *B64C 2201/10* (2013.01); *B64C 2201/104* (2013.01); *B64D 2033/0273* (2013.01); *F05D 2220/90* (2013.01); *Y02T 50/166* (2013.01); *Y02T 50/32* (2013.01); *Y02T 50/44* (2013.01)

(58) Field of Classification Search
CPC . B64C 33/04; B64C 15/14; F02K 1/28; F02K 1/36; F02K 1/38; F02K 1/386; F02K 469/82; B63H 2011/002; B63H 2011/004
See application file for complete search history.

(56) References Cited

U.S. PATENT DOCUMENTS

| | | |
|---|---|---|
| 3,747,874 A | 7/1973 | Johnsen |
| 4,099,691 A | 7/1978 | Swanson et al. |
| (Continued) | | |

OTHER PUBLICATIONS

International Search Report and Written Opinion, Application No. PCT/US16/44327, dated Jun. 5, 2017, 19 pages.

*Primary Examiner* — Nicholas McFall
(74) *Attorney, Agent, or Firm* — P.G. Scott Born; Foster Garvey PC

(57) ABSTRACT

A propulsion system coupled to a vehicle. The system includes a convex surface, a diffusing structure coupled to the convex surface, and at least one conduit coupled to the convex surface. The conduit is configured to introduce to the convex surface a primary fluid produced by the vehicle. The system further includes an intake structure coupled to the convex surface and configured to introduce to the diffusing structure a secondary fluid accessible to the vehicle. The diffusing structure comprises a terminal end configured to provide egress from the system for the introduced primary fluid and secondary fluid.

9 Claims, 11 Drawing Sheets

(51) Int. Cl.
*B64D 27/10* (2006.01)
*B64C 21/04* (2006.01)
*F02K 1/36* (2006.01)
*F02K 1/00* (2006.01)
*F02C 3/04* (2006.01)
*F02C 6/04* (2006.01)

(56) References Cited

U.S. PATENT DOCUMENTS

| | | | |
|---|---|---|---|
| 4,192,461 A * | 3/1980 | Arborg | B63H 11/02 |
| | | | 114/151 |
| 4,311,291 A | 1/1982 | Gilbertson et al. | |
| 4,448,354 A * | 5/1984 | Reznick | B64C 29/00 |
| | | | 239/265.17 |
| 4,713,935 A | 12/1987 | Szuminski et al. | |
| 5,062,588 A | 11/1991 | Garland | |
| 8,690,098 B2 | 4/2014 | Todorovic | |
| 2011/0215204 A1 * | 9/2011 | Evulet | B64D 33/02 |
| | | | 244/53 B |
| 2013/0336781 A1 * | 12/2013 | Rolt | B64C 9/16 |
| | | | 415/208.1 |

* cited by examiner

FLUIDIC PROPULSIVE SYSTEM

PRIORITY CLAIM

This application claims priority to U.S. Provisional Application No. 62/213,465, filed Sep. 2, 2015, the entire disclosure of which is hereby incorporated by reference as if fully set forth herein.

COPYRIGHT NOTICE

This disclosure is protected under United States and International Copyright Laws. © 2016 Jetoptera. All rights reserved. A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyrights whatsoever.

BACKGROUND

Aircrafts that can hover, take off and land vertically are commonly referred to as Vertical Take-Off and Landing (VTOL) aircrafts. This classification includes fixed-wing aircrafts as well as helicopters and aircraft with tilt-able powered rotors. Some VTOL aircrafts can operate in other modes as well, such as Short Take-Off and Landing (STOL). VTOL is a subset of V/STOL (Vertical and/or Short Take-off and Landing).

For illustrative purposes, an example of a current aircraft that has VTOL capability is the F-35 Lightning. Conventional methods of vectoring the vertical lift airflow includes the use of nozzles that can be swiveled in a single direction along with the use of two sets of flat flapper vanes arranged 90 degrees to each other and located at the external nozzle. The propulsion system of the F-35 Lightning, similarly, provides vertical lifting force using a combination of vectored thrust from the turbine engine and a vertically oriented lift fan. The lift fan is located behind the cockpit in a bay with upper and lower clamshell doors. The engine exhausts through a three-bearing swivel nozzle that can deflect the thrust from horizontal to just forward of vertical. Roll control ducts extend out in each wing and are supplied with their thrust with air from the engine fan. Pitch control is affected via lift fan/engine thrust split. Yaw control is through yaw motion of the engine swivel nozzle. Roll control is provided by differentially opening and closing the apertures at the ends of the two roll control ducts. The lift fan has a telescoping "D"-shaped nozzle to provide thrust deflection in the forward and aft directions. The D-nozzle has fixed vanes at the exit aperture.

The design of an aircraft or drone more generally consists of its propulsive elements and the airframe into which those elements are integrated. Conventionally, the propulsive device in aircrafts can be a turbojet, turbofan, turboprop or turboshaft, piston engine, or an electric motor equipped with a propeller. The propulsive system (propulsor) in small unmanned aerial vehicles (UAVs) is conventionally a piston engine or an electric motor which provides power via a shaft to one or several propellers. The propulsor for a larger aircraft, whether manned or unmanned, is traditionally a jet engine or a turboprop. The propulsor is generally attached to the fuselage or the body or the wings of the aircraft via pylons or struts capable of transmitting the force to the aircraft and sustaining the loads. The emerging mixed jet (jet efflux) of air and gases is what propels the aircraft in the opposite direction to the flow of the jet efflux.

Conventionally, the air stream efflux of a large propeller is not used for lift purposes in level flight and a significant amount of kinetic energy is hence not utilized to the benefit of the aircraft, unless it is swiveled as in some of the applications existing today (namely the Bell Boeing V-22 Osprey). Rather, the lift on most existing aircrafts is created by the wings and tail. Moreover, even in those particular VTOL applications (e.g., take-off through the transition to level flight) found in the Osprey, the lift caused by the propeller itself is minimal during level flight, and most of the lift force is nonetheless from the wings.

The current state of art for creating lift on an aircraft is to generate a high-speed airflow over the wing and wing elements, which are generally airfoils. Airfoils are characterized by a chord line extended mainly in the axial direction, from a leading edge to a trailing edge of the airfoil. Based on the angle of attack formed between the incident airflow and the chord line, and according to the principles of airfoil lift generation, lower pressure air is flowing over the suction (upper) side and conversely, by Bernoulli law, moving at higher speeds than the lower side (pressure side). The lower the airspeed of the aircraft, the lower the lift force, and higher surface area of the wing or higher angles of incidence are required, including for take-off.

Large UAVs make no exception to this rule. Lift is generated by designing a wing airfoil with the appropriate angle of attack, chord, wingspan, and camber line. Flaps, slots and many other devices are other conventional tools used to maximize the lift via an increase of lift coefficient and surface area of the wing, but it will be generating the lift corresponding to at the air-speed of the aircraft. (Increasing the area (S) and lift coefficient ($C_L$) allow a similar amount of lift to be generated at a lower aircraft airspeed (V0) according to the formula $L=\frac{1}{2}\rho V^2 S C_L$, but at the cost of higher drag and weight.) These current techniques also perform poorly with a significant drop in efficiency under conditions with high cross winds.

While smaller UAVs arguably use the thrust generated by propellers to lift the vehicle, the current technology strictly relies on control of the electric motor speeds, and the smaller UAV may or may not have the capability to swivel the motors to generate thrust and lift, or transition to a level flight by tilting the propellers. Furthermore, the smaller UAVs using these propulsion elements suffer from inefficiencies related to batteries, power density, and large propellers, which may be efficient in hovering but inefficient in level flight and create difficulties and danger when operating due to the fast moving tip of the blades. Most current quadcopters and other electrically powered aerial vehicles are only capable of very short periods of flight and cannot efficiently lift or carry large payloads, as the weight of the electric motor system and battery is already well exceeding 70% of the weight of the vehicle. A similar vehicle using jet fuel or any other hydrocarbon fuel typically used in transportation will carry more usable fuel by at least one order of magnitude. This can be explained by the much higher energy density of the hydrocarbon fuel compared to battery systems (by at least one order of magnitude), as well as the lower weight to total vehicle weight ratio of a hydrocarbon fuel based system.

Accordingly, there is a need for enhanced efficiency, improved capabilities, and other technological advancements in aircrafts, particularly to UAVs and certain manned aerial vehicles.

BRIEF DESCRIPTION OF THE DRAWING FIGURES

DETAILED DESCRIPTION

This application is intended to describe one or more embodiments of the present invention. It is to be understood that the use of absolute terms, such as "must," "will," and the like, as well as specific quantities, is to be construed as being applicable to one or more of such embodiments, but not necessarily to all such embodiments. As such, embodiments of the invention may omit, or include a modification of, one or more features or functionalities described in the context of such absolute terms. In addition, the headings in this application are for reference purposes only and shall not in any way affect the meaning or interpretation of the present invention.

One embodiment of the present invention includes a propulsor that utilizes fluidics for the entrainment and acceleration of ambient air and delivers a high speed jet efflux of a mixture of the high pressure gas (supplied to the propulsor from a gas generator) and entrained ambient air. In essence, this objective is achieved by discharging the gas adjacent to a convex surface. The convex surface is a so-called Coanda surface benefitting from the Coanda effect described in U.S. Pat. No. 2,052,869 issued to Henri Coanda on Sep. 1, 1936. In principle, the Coanda effect is the tendency of a jet-emitted gas or liquid to travel close to a wall contour even if the direction of curvature of the wall is away from the axis of the jet. The convex Coanda surfaces discussed herein with respect to one or more embodiments does not have to consist of any particular material.

Figure 1:
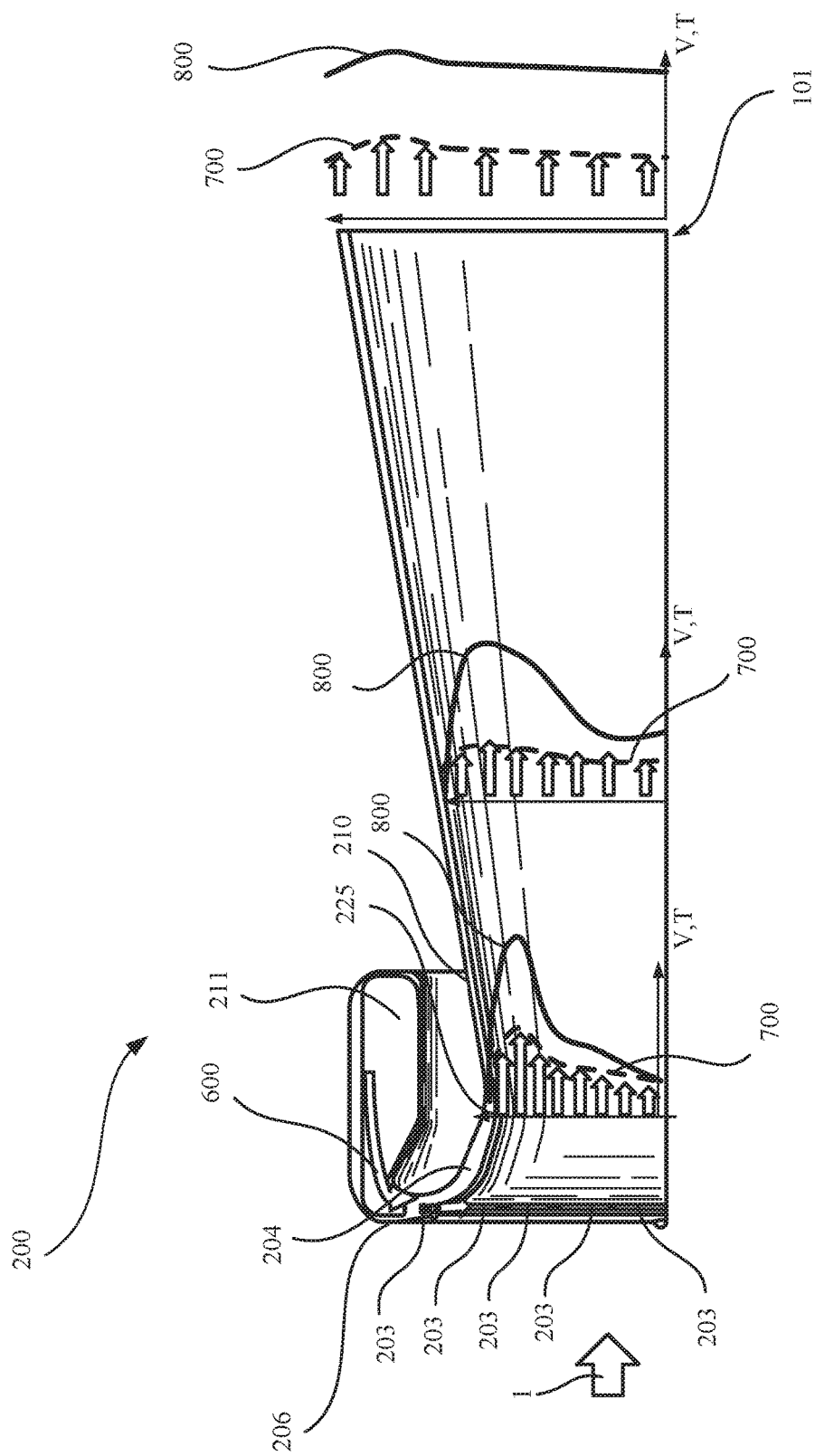
FIG. 1 is a cross-section of one embodiment of the present invention depicting the upper half of an ejector and profiles of velocity and temperature within the internal flow.

FIG. 1 illustrates a cross-section of the upper half of an ejector 200 that may be attached to a vehicle (not shown), such as, for non-limiting examples, a UAV or a manned arial vehicle, such as an airplane. A plenum 211 is supplied with hotter-than-ambient air (i.e., a pressurized motive gas stream) from, for example, a combustion-based engine that may be employed by the vehicle. This pressurized motive gas stream, denoted by arrow 600, is introduced via at least one conduit, such as primary nozzles 203, to the interior of the ejector 200. More specifically, the primary nozzles 203 are configured to accelerate the motive fluid stream 600 to a variable predetermined desired velocity directly over a convex Coanda surface 204 as a wall jet. Additionally, primary nozzles 203 provide adjustable volumes of fluid stream 600. This wall jet, in turn, serves to entrain through an intake structure 206 secondary fluid, such as ambient air denoted by arrow 1, that may be at rest or approaching the ejector 200 at non-zero speed from the direction indicated by arrow 1. In various embodiments, the nozzles 203 may be arranged in an array and in a curved orientation, a spiraled orientation, and/or a zigzagged orientation.

The mix of the stream 600 and the air 1 may be moving purely axially at a throat section 225 of the ejector 200. Through diffusion in a diffusing structure, such as diffuser 210, the mixing and smoothing out process continues so the profiles of temperature (800) and velocity (700) in the axial direction of ejector 200 no longer have the high and low values present at the throat section 225, but become more uniform at the terminal end 100 of diffuser 210. As the mixture of the stream 600 and the air 1 approaches the exit plane of terminal end 100, the temperature and velocity profiles are almost uniform. In particular, the temperature of the mixture is low enough to be directed towards an airfoil such as a wing or control surface.

Figure 2:
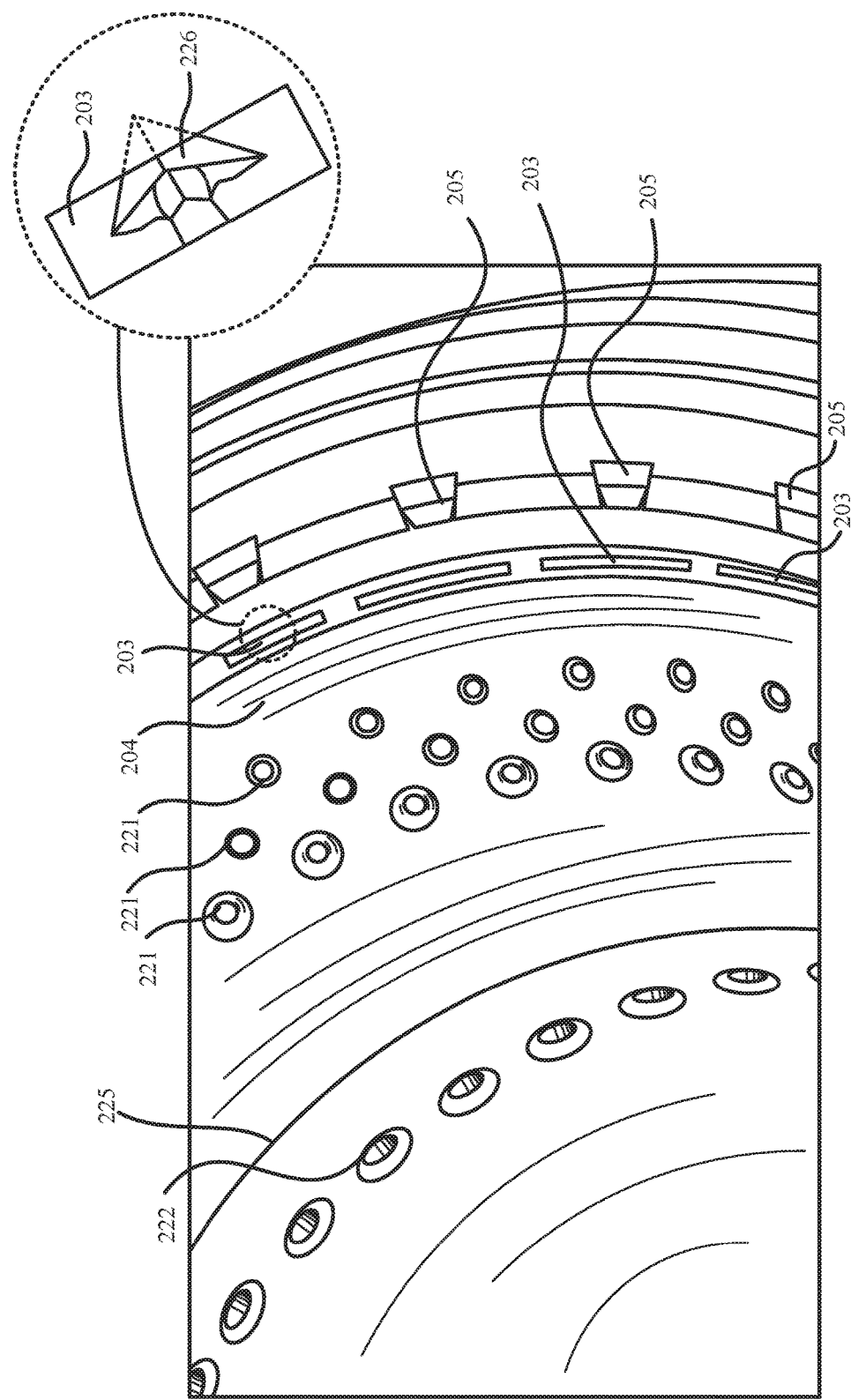
FIG. 2 illustrates features of surfaces of the ejector of FIG. 1 according to an embodiment.

In an embodiment, and as best illustrated in FIG. 2, V-shaped, vortex generating secondary nozzles 205 are staggered when compared to a normal rectangular primary nozzle 203 and injecting at least 25% of the total fluid stream 600 before the balance of the fluid stream massflow is injected at a moment later by nozzles 203. This injection by nozzles 205 prior to that of nozzles 203 results in a higher entrainment rate enough to significantly increase the performance of the ejector 200. Secondary nozzles 205 introduce a more-favorable entrainment of the secondary flow via shear layers and are staggered both axially and circumferentially in relation to the primary nozzles 203.

Primary nozzles 203 may include a delta-wing structure 226 that is provided with a supporting leg connected to the middle point of the primary nozzle 203 structure at its innermost side, with a delta-wing structure apex pointing against the fluid stream 600 flow. This in turn generates two vortices opposed in direction and strongly entraining from both sides of primary nozzle 203 the already entrained mixture of primary and secondary fluid flows resulting from nozzles 205.

Additionally, an embodiment improves the surface for flow separation delay via elements such as dimples 221 placed on the Coanda surface 204. The dimples 221 prevent separation of the flow and enhance the performance of the ejector 200 significantly. Additionally, surfaces of the diffuser 210 (see FIG. 1) may also include dimples 222 and/or other elements that delay or prevent separation of the boundary layer.

Figure 3:
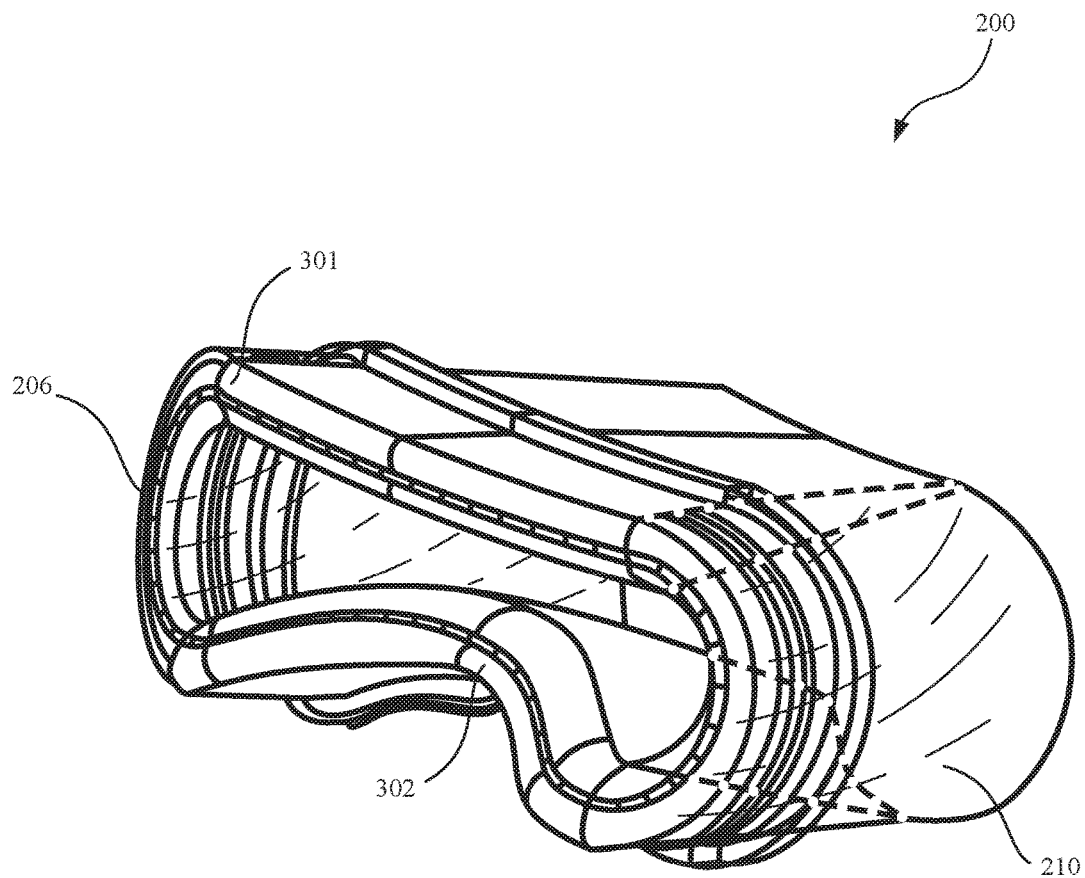
FIGS. 3-4 illustrate partial perspective views of intake structures according to one or more embodiments.
Figure 4:
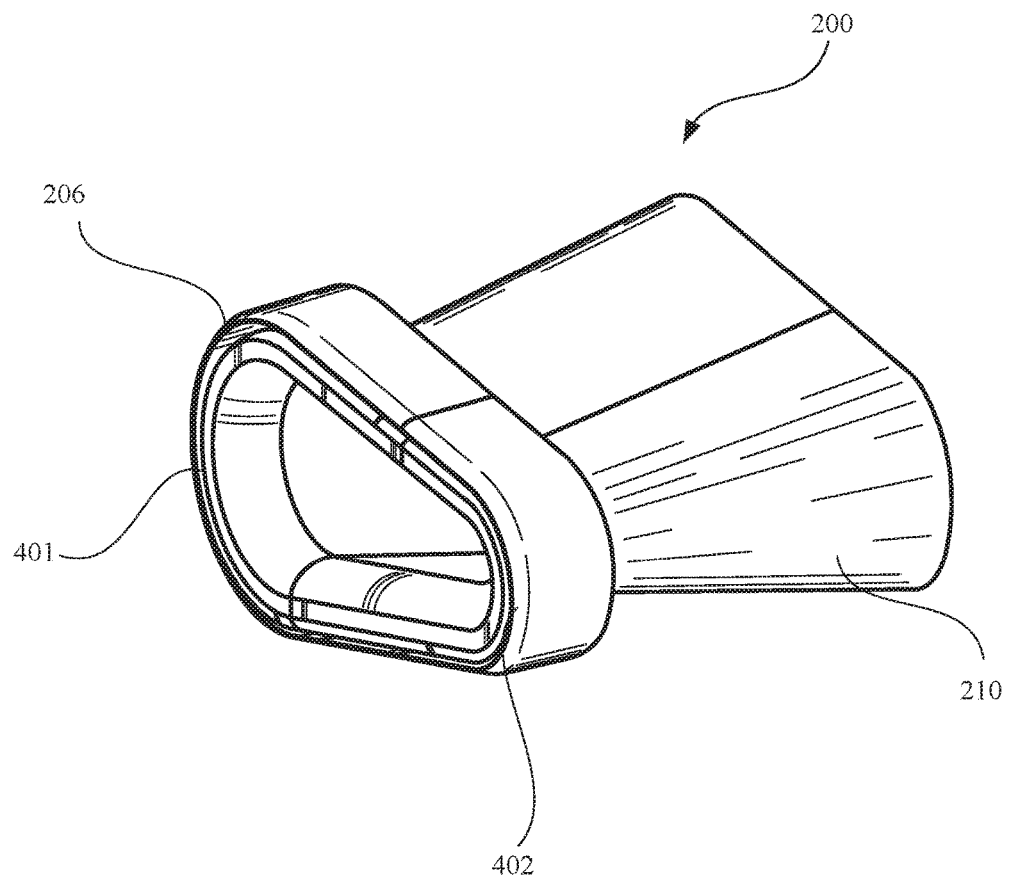

In an embodiment, intake structure 206 may be circular in configuration. However, in varying embodiments, and as best shown in FIGS. 3-4, intake structure 206 can be non-circular and, indeed, asymmetrical (i.e., not identical on both sides of at least one, or alternatively any-given, plane bisecting the intake structure). For example, as shown in FIG. 3, the intake structure 206 can include first and second opposing edges 301, 302, wherein the second opposing edge includes a curved portion projecting toward the first opposing edge. As shown in FIG. 4, the intake structure 206 can include first and second lateral opposing edges 401, 402, wherein the first lateral opposing edge has a greater radius of curvature than the second lateral opposing edge.

Figure 5:
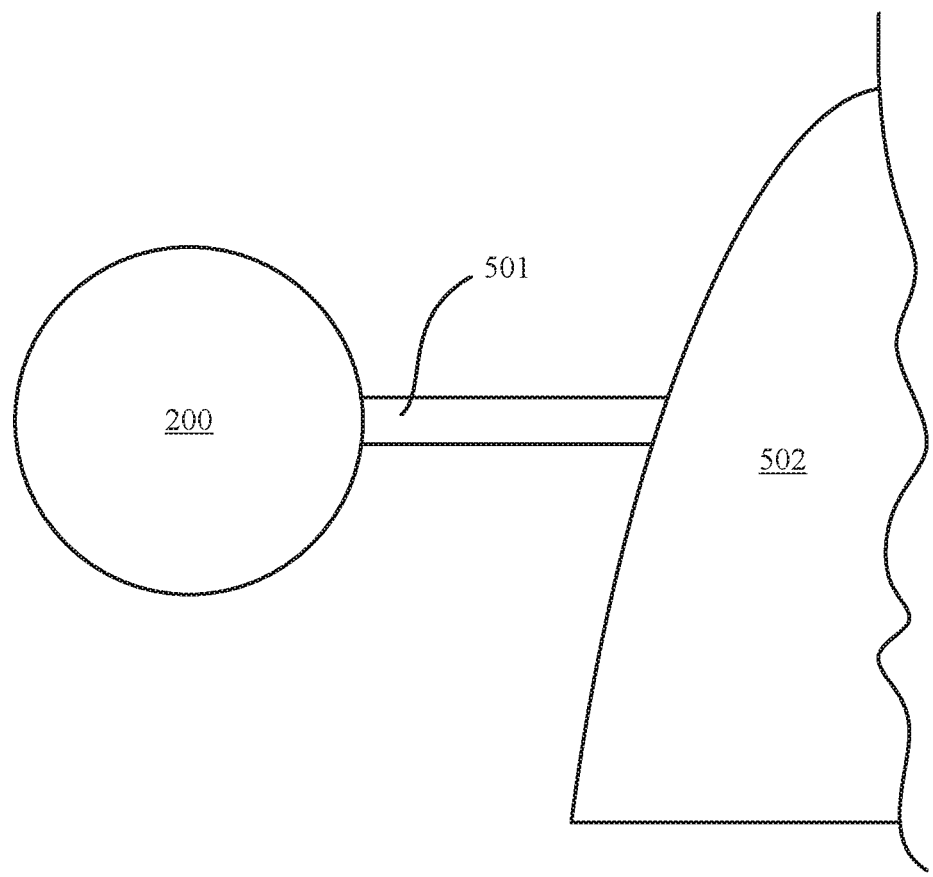
FIG. 5 is a rear plan view of an actuator according to an embodiment.

Referring to FIG. 5, an embodiment may include at least one actuating element 501 coupling the ejector 200 to a vehicle 502. Element 501 is configured to provide at least two, and preferably three, dimensions of movement (i.e., six degrees of freedom) of the ejector 200 relative to the vehicle 502.

Figure 6:
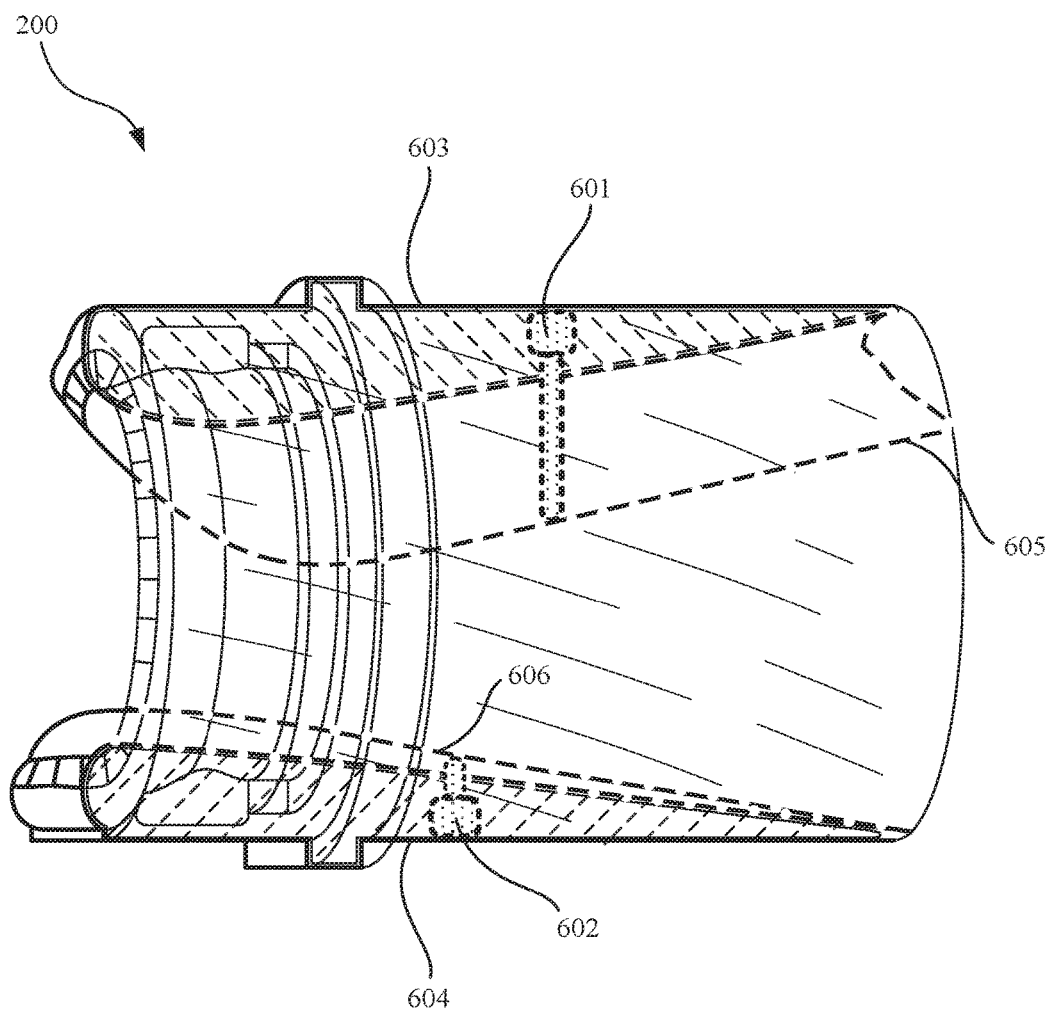
FIG. 6 illustrates in cross-section alteration of ejector internal geometries according to an embodiment.

Referring to FIG. 6, an embodiment may include at least one internal actuating element (e.g., actuators and/or linkages) 601, 602 disposed between external surfaces 603, 604 and internal surfaces 605, 606 of ejector 200. In the illustrated embodiment, actuator 601 is configured to move (e.g., toward and away from the center axis of ejector 200) the first surface 605 relative to the second surface 606 when the second surface is not moving. Similarly, second actuator 602 is configured to move the second surface 606 relative to the first surface 605 when the first surface is not moving. This ability to alter the internal geometry of the ejector 200 into multiple configurations allows ejector to optimally operate in multiple flight conditions (e.g., liftoff, takeoff, cruising flight, etc.).

Figure 7:
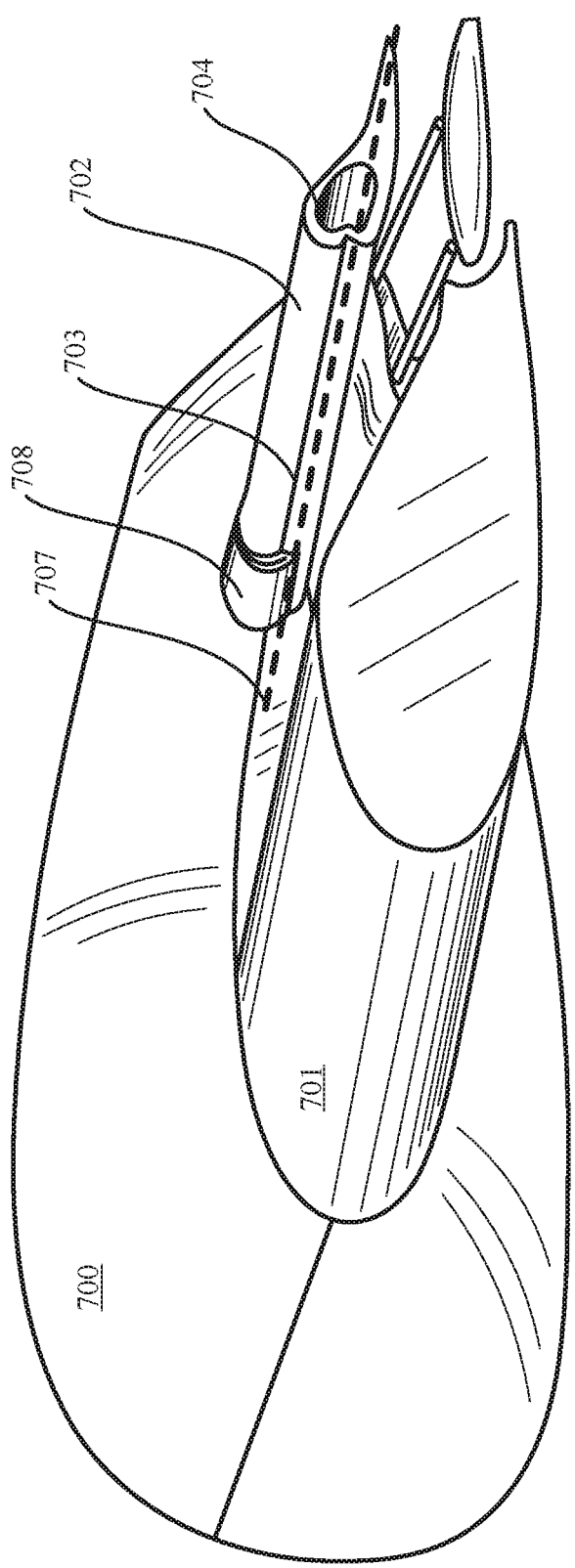
FIG. 7 is a side perspective view of an alternative embodiment.
Figure 8:
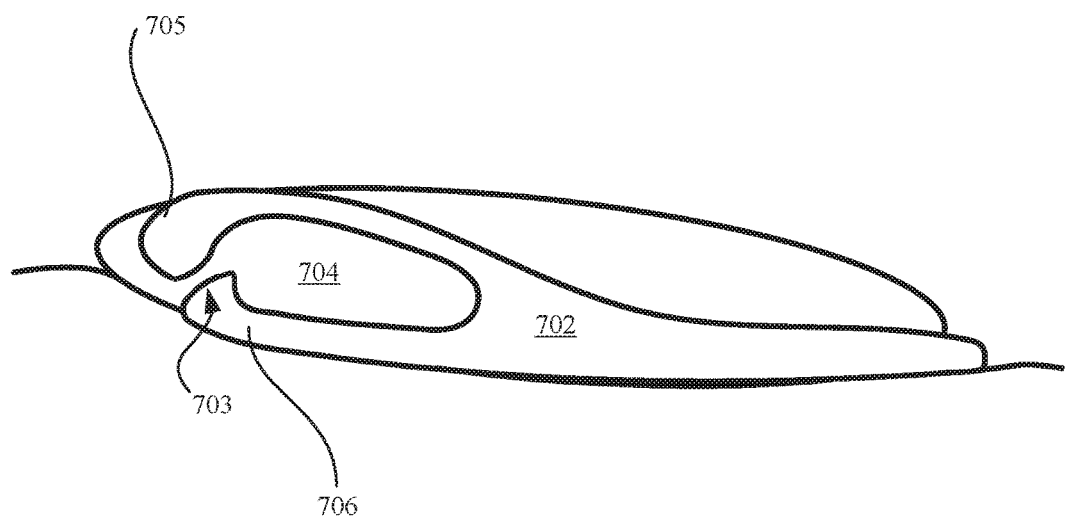
FIG. 8 is a side view of element of the embodiment illustrated in FIG. 7.

FIG. 7 illustrates a propulsion system for a vehicle 700 according to an alternative embodiment. A first secondary airfoil 702 is coupled to the vehicle 700 and positioned downstream of fluid flowing over a primary airfoil 701 of the vehicle. Airfoil 702 is configured to rotate about axis 707 and controlled by an actuator 708. As best illustrated in FIG. 8, the first secondary airfoil 702 includes a first output structure, such as opposing nozzle surfaces 705, 706 and at least one conduit, such as plenum 704, in fluid communication with a terminal end 703 defined by the nozzle surfaces. Nozzle surfaces 705, 706 may or may not include nozzles similar to nozzles 203 discussed above with reference to FIG. 1. Additionally, one or more of nozzle surfaces 705, 706 may include a convex surface that can, consequently, promote the Coanda effect and may have continuously rounded surfaces with no sharp or abrupt corners. Plenum 704 is supplied with hotter-than-ambient air (i.e., a pressurized motive gas stream) from, for example, a combustion-based engine that may be employed by the vehicle 700. Plenum 704 is configured to introduce this gas stream to the terminal end 703, which is configured to provide egress for the gas stream toward the primary airfoil 701 and out of the first secondary airfoil 702.

Figure 9:
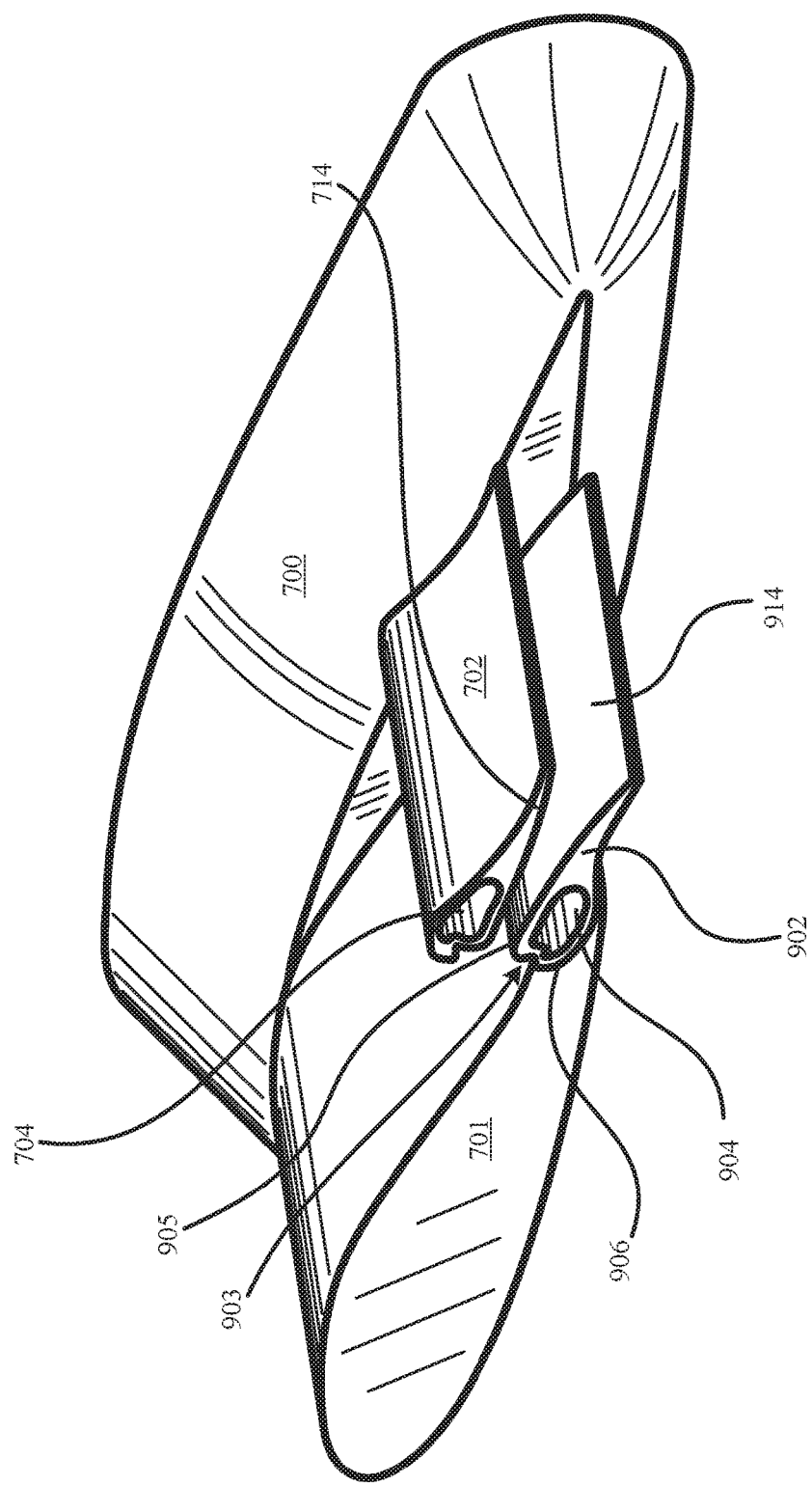
FIGS. 9-11 illustrate another alternative embodiment of the invention.
Figure 10:
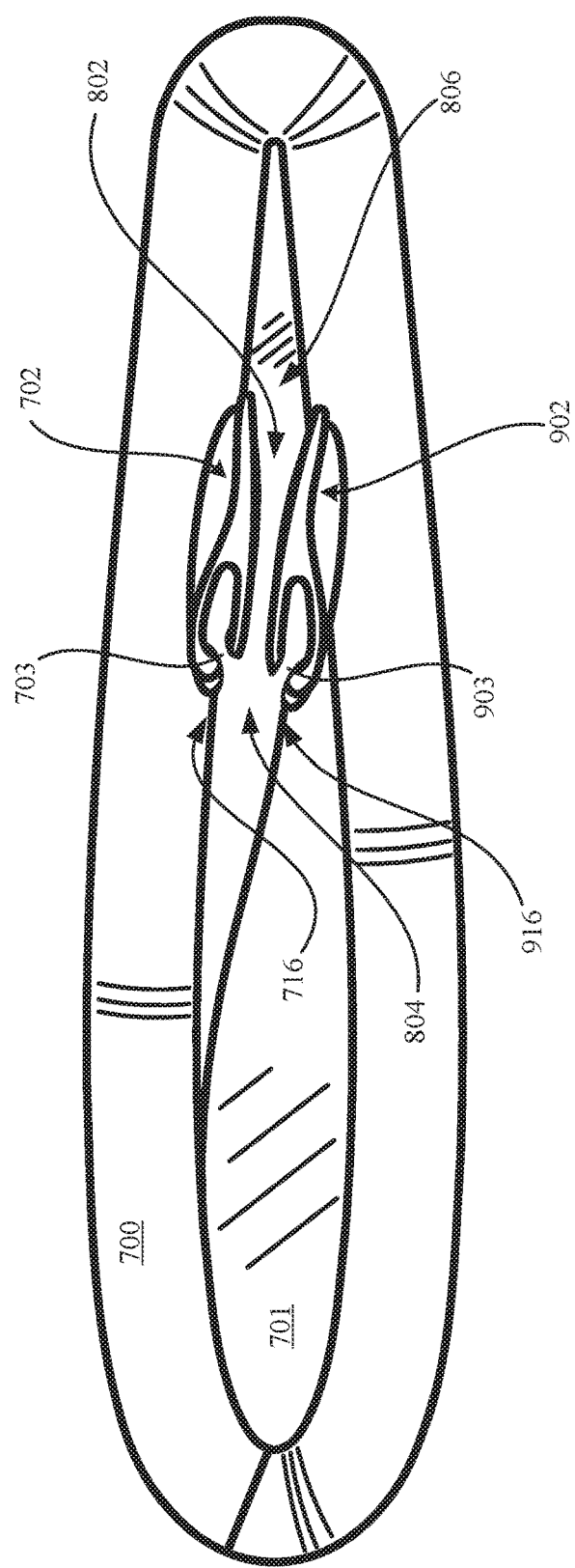
Figure 11:
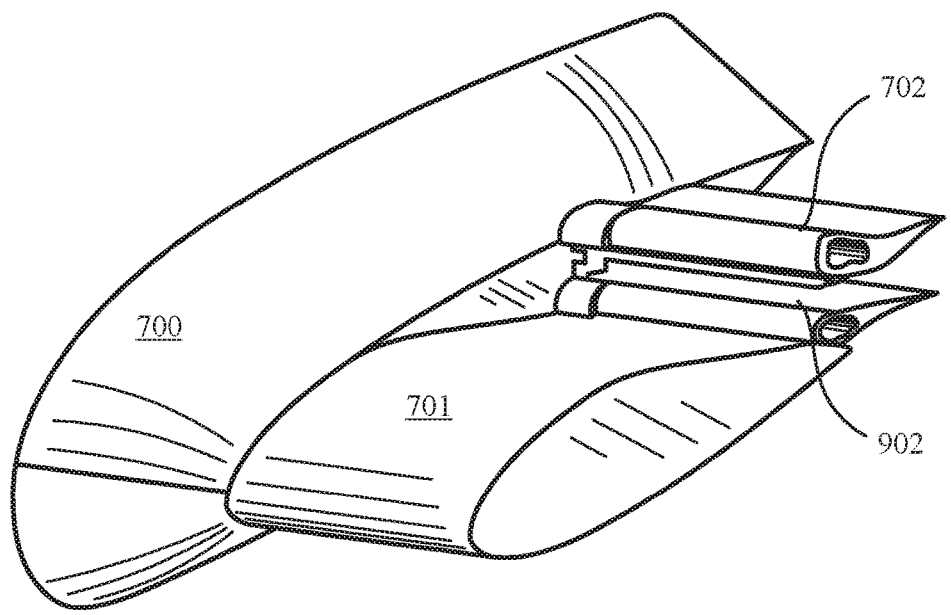

Referring to FIGS. 9-11, an embodiment may include a second secondary airfoil 902 similar to airfoil 702, each with a respective trailing edge 714, 914 diverging from the other trailing edge. More particularly, second secondary airfoil 902 is coupled to the vehicle 700 and positioned downstream of fluid flowing over the primary airfoil 701 of the vehicle. Airfoil 902 is configured to rotate in a manner similar to that discussed above with reference to airfoil 702. Airfoil 902 includes a first output structure, such as opposing nozzle surfaces 905, 906 and at least one conduit, such as plenum 904, in fluid communication with a terminal end 903 defined by the nozzle surfaces. Nozzle surfaces 905, 906 may or may not include nozzles similar to nozzles 203 discussed above with reference to FIG. 1. Additionally, one or more of nozzle surfaces 905, 906 may include a convex surface that can, consequently, promote the Coanda effect. Plenum 904 is supplied with hotter-than-ambient air (i.e., a pressurized motive gas stream) from, for example, a combustion-based engine that may be employed by the vehicle 700. Plenum 904 is configured to introduce this gas stream to the terminal end 903, which is configured to provide egress for the gas stream toward the primary airfoil 701 and out of the second secondary airfoil 902.

Each of the first and second secondary airfoils 702, 902 has a leading edge 716, 916 disposed toward the primary airfoil, with the first secondary airfoil opposing the second secondary airfoil. In operation, the first and second secondary airfoils 702, 902 define a diffusing region 802, therebetween and along their lengths, similar in function to diffuser 210 discussed above herein. The leading edges 716, 916 define an intake region 804 configured to receive and introduce to the diffusing region 802 the gas streams from plena 704, 904 and the fluid flowing over the primary airfoil 701. The diffusing region 802 includes a primary terminal end 806 configured to provide egress from the diffusing region for the introduced gas streams and fluid flowing over the primary airfoil 701.

Although the foregoing text sets forth a detailed description of numerous different embodiments, it should be understood that the scope of protection is defined by the words of the claims to follow. The detailed description is to be construed as exemplary only and does not describe every possible embodiment because describing every possible embodiment would be impractical, if not impossible. Numerous alternative embodiments could be implemented, using either current technology or technology developed after the filing date of this patent, which would still fall within the scope of the claims.

Thus, many modifications and variations may be made in the techniques and structures described and illustrated herein without departing from the spirit and scope of the present claims. Accordingly, it should be understood that the methods and apparatus described herein are illustrative only and are not limiting upon the scope of the claims.

What is claimed is:

1. A propulsion system coupled to a vehicle, the system comprising:
    a convex surface having a perimeter and a plurality of recesses;
    a diffusing structure coupled to the convex surface;
    at least one conduit coupled to the convex surface and configured to introduce to the convex surface via multiple nozzles distributed along the entirety of the perimeter a primary fluid produced by the vehicle; and
    an intake structure coupled to the convex surface and configured to introduce to the diffusing structure a secondary fluid accessible to the vehicle, wherein the nozzles are downstream of the intake structure, and wherein the diffusing structure comprises a terminal end configured to provide egress from the system for the introduced primary fluid and secondary fluid.

2. The system of claim 1, wherein the at least one conduit comprises an array of nozzles arranged in at least one of a curved orientation, a spiraled orientation, and a zigzagged orientation.

3. The system of claim 1, wherein the intake structure is asymmetrical.

4. A propulsion system coupled to a vehicle, the system comprising:
    a diffusing structure;
    at least one conduit coupled to the diffusing structure and configured to introduce to the diffusing structure a primary fluid produced by the vehicle; and
    an asymmetrical intake structure coupled to the diffusing structure and configured to introduce to the diffusing structure a secondary fluid accessible to the vehicle, wherein the diffusing structure comprises a terminal end configured to provide egress from the system for the introduced primary fluid and secondary fluid, and wherein the intake structure comprises first and second lateral opposing edges, and the first lateral opposing edge has a greater radius of curvature than the second lateral opposing edge.

5. The system of claim 4, wherein the at least one conduit comprises an array of conduits arranged in at least one of a curved orientation, a spiraled orientation, and a zigzagged orientation.

6. The system of claim 4, further comprising a convex surface, wherein the at least one conduit is configured to introduce to the convex surface the primary fluid produced by the vehicle.

7. A propulsion system coupled to a vehicle, the system comprising:
- a diffusing structure;
- at least one conduit coupled to the diffusing structure and configured to introduce to the diffusing structure a primary fluid produced by the vehicle; and
- an asymmetrical intake structure coupled to the diffusing structure and configured to introduce to the diffusing structure a secondary fluid accessible to the vehicle, wherein the diffusing structure comprises a terminal end configured to provide egress from the system for the introduced primary fluid and secondary fluid, and wherein the intake structure comprises first and second opposing edges, and the second opposing edge includes a curved portion projecting toward the first opposing edge.

8. The system of claim 7, wherein the at least one conduit comprises an array of conduits arranged in at least one of a curved orientation, a spiraled orientation, and a zigzagged orientation.

9. The system of claim 7, further comprising a convex surface, wherein the at least one conduit is configured to introduce to the convex surface the primary fluid produced by the vehicle.

* * * * *